United States Patent Office 3,073,675
Patented Jan. 15, 1963

3,073,675
REMOVAL OF IONIC IMPURITIES FROM CALCINED ALUMINA
Leonard N. Leum, Media, James E. Connor, Jr., Drexel Hill, John J. Rothrock, Ambler, and Clifford S. Shipley, Aldan, Pa., assignors to The Atlantic Refining Company, Philadelphia, Pa., a corporation of Pennsylvania
No Drawing. Filed Mar. 1, 1960, Ser. No. 11,991
6 Claims. (Cl. 23—141)

This invention relates to a method for the removal of ionic impurities from calcined alumina and, more particularly, this invention relates to a method for the removal of ionic impurities from calcined alumina by the use of ion exchange resins.

In recent years it has been recognized that if ionic materials are contained on alumina which is being used as a carrier for other catalysts, such impurities can deleteriously affect the catalyst deposited on the alumina. Calcined alumina has long been used as a carrier for hydrogenation catalysts, dehydrogenation catalysts, hydrodesulfurization catalysts, hydrocracking catalysts, cyclization catalysts and similar catalysts. Specifically, the active catalysts which may be associated with the alumina include nickel, the platinum metals, chromia, molybdena, cobalt molybdate, molybdenum sulfate, and the like. In order to provide active and stable catalyst compositions, it has been found that the alumina should be free of ionic impurities. I has been found also that alumina, when used as a carrier for platinum in certain types of reforming catalysts, should be free of sodium and halogen impurities in order that the catalyst will have maximum activity and stability.

Heretofore manufacturers of alumina have either removed only nominal amounts of impurities during manufacture or have resorted to extreme precautions to prevent contamination by the use of costly, high purity raw materials and reagent chemicals. It now has been found that ionic impurities can be removed from calcined alumina by forming an aqueous suspension of the calcined alumina and contacting the suspension with an ion exchange resin. In those instances where the impurities are anionic, an anionic exchange resin is employed; whereas with cationic impurities, a cationic exchange resin is employed.

It is an object of this invention to provide a method for the removal of ionic impurities from calcined alumina.

It is a further object of this invention to provide a method for the removal of cationic impurities from calcined alumina.

It is a further object of this invention to provide a method for the removal of anionic impurities from calcined alumina.

It is a further object of this invention to provide a method for the removal of ionic impurities from calcined alumina by the use of ion exchange resins.

Additional objects of this invention will be apparent from the description and claims that follow.

In accordance with the method of this invention the calcined alumina, preferably in a form of small particles or powder, is suspended in water. It is preferred that sufficient water be utilized to produce a suspension which is easily pumped or agitated. Suspensions containing from 1 percent to 40 percent by weight of the calcined alumina may be utilized in this invention. In certain instances where the particle size of the alumina is relatively large and uniform, higher solid contents may be employed to give a suspension which may be agitated readily.

The suspension is treated with solid particles of an ion exchange resin which particles are of a different size from the size of the calcined alumina particles being treated so that subsequently the solid ion exchange resin may be separated from the particles of alumina by simple methods such as by screening or by elutriation.

It has been found that the particles of calcined alumina in the aqueous suspension may be separated readily from the particles of ion exchange resin if the particle size of the calcined alumina is such that it will pass through a 100 mesh U.S. Standard Sieve and the particles of the ion exchange resin are of 20 to 40 mesh in size (U.S. Standard Sieve). Thus, the aqueous suspension of the alumina particles may be passed upwardly through a column of ion exchange particles which are held in check from upward movement by a screen that has openings small enough to retain the ion exchange particles, but large enough to allow free passage of the alumina particles in suspension. Upward flow of the suspension through the ion exchange particles is preferred to a downward flow of the alumina suspension through a bed of ion exchange resin since with the latter the bed of ion exchange material performs as a filter bed and will soon plug with the retained alumina particles. In the upflow method the movement of the water suspends and separates the particles of ion exchange resin such that the suspension of the alumina particles passes through the resin bed without any filtering action.

Instead of passing the calcined alumina suspension in a continuous stream through the ion exchange particles, a semicontinuous process may be used wherein the calcined alumina aqueous suspension is added to a vessel containing an ion exchange material and the mixture agitated. After separating the alumina suspension from the ion exchange material in the first vessel, it may be added to a second vessel of ion exchange material and the process repeated for as many times as may be required to remove the impurities.

A further alternative method involves simple batch treatment wherein the alumina aqueous suspension is mixed with an ion exchange resin, the mixture thoroughly agitated and thereafter separated.

It is preferable that the particle size of the calcined alumina be larger than approximately ten microns in diameter so that when the oxide is placed in suspension a colloidal solution will not result. Manufacturers of ion exchange resins usually produce such materials in the form of granules ranging between 20 and 40 mesh. Accordingly, this is the preferred range of particle size for the ion exchange material since with this particle size range the particles of ion exchange material may be separated readily from the particles of calcined alumina. The ionic impurities in the calcined alumina may result either from their introduction during the preparation or manufacture of the alumina, or from contact by the alumina with such impurities contained in charge material passed over them. Sodium is most often introduced into alumina during its preparation or manufacture and, consequently, elaborate precautions have been developed to exclude this impurity, which precautions have added materially to the cost of the alumina. Nevertheless, the presence of sodium as an impurity still remains as a problem. In addition, sodium because of its wide spread occurrence is often introduced as an impurity along with the charge materials which contact the alumina being used as a carrier.

In certain instances heavy metal impurities such as iron, nickel ar vanadium may be introduced into or deposited on the alumina either during its manufacture or when it comes into contact with a charge material containing these heavy metal impurities. These heavy metals are of themselves often catalytic, and, in general, they tend to promote undesired side reactions. Consequently, when the alumina being used as a catalyst carrier becomes contaminated with such metals it is usually necessary to remove the alumina and discard it since ordinary regenerative treatments are not effective for the removal of such metal impurities.

Since the aforementioned metallic impurities are cationic, they may be removed by the use of a cation exchange material in the hydrogen cycle. The cation exchange materials suitable for this invention may be any one of the large number of commercially available strong acid, synthetic type materials including the so-called cation exchange resins such as Amberlite IR–120 or Permutit-Q, which are produced by the sulfonation of the copolymer prepared from a mixture of styrene and divinylbenzene. Amberlite IR–120 and Permutit-Q are well-known to the art of ion exchange and their preparation is described in detail in both the patented art and in the technical literature, in particular, the detailed method for their preparation is set forth starting with the first full paragraph on page 84 of the book of Robert Kunin, entitled "Ion Exchange Resins," Second Edition, John Wiley and Sons, Inc., New York (1958). The individual capacities, rates of exchange and similar properties of the cation exchange resins are supplied by their manufacturers and, therefore, further description of such cation exchange resins is believed unnecessary. These cationic exchangers as manufactured and shipped are wetted with water and they are used in this condition.

Various anionic impurities, particularly the halide ions, have been found to be deleterious to the activity and stability of certain catalysts when such anions are contained as impurities in the alumina used as a catalyst carrier. In order to remove these anionic impurities, an anion exchange material in the hydroxyl cycle is employed. Numerous anion exchange materials are available commercially and may be used in the present invention, for example, the anion exchange resin sold under the designation of Amberlite IRA–400 has been found to be particularly useful. This resin which is a quaternary, strong base type resin is prepared by reacting a tertiary amine with a chloromethylated copolymer of styrene and divinylbenzene and is described in U.S. Patent No. 2,591,573. With respect to the Amberlite IRA–400 resin the production of the copolymer is described in detail in the first full paragraph of page 84 of the book by Robert Kunin, entitled "Ion Exchange Resins," Second Edition, John Wiley & Sons, Inc. New York (1958). The chloromethylation of this copolymer and subsequent reaction with trimethylamine is described in detail in the last full paragraph of page 88 and continued on page 97 of this book. The ion exchange capacity and other pertinent information relative to anion exchangers are supplied by the manufacturers of such materials and may also be found in the aforementioned book. As in the case with the cation exchangers the anion exchangers are manufactured and shipped wetted with water and are used in this condition.

In addition to halide ions, other anions which may be removed from calcined alumina by the use of anion exchange materials are sulfates, nitrates, phosphates, and similar anionic impurities.

The removal of the impurities from a calcined alumina may be carried out at temperatures ranging from room temperature to the temperature at which the exchange resins disintegrate, certain resins being stable up to 250° F. while others should not be used at temperatures above 120° F. In any event, however, the upper temperature is limited only by the temperature at which the particular type of ion exchange material employed disintegrates. With contacting temperatures above the boiling point of the water superatmospheric pressures, of course, are required in order to keep the water in the liquid phase. However, with contacting temperatures below the boiling point of water the contacting may be carried out at atmospheric pressure.

The time of contact between the calcined alumina and the ion exchanger is influenced by the temperature of contacting, the amount of ionic impurities on the alumina and the amount of ionic impurities it is desired to remove from the alumina. Longer times are required if it is desired to remove substantially completely the ionic impurities from the alumina than if it is desired to remove only a portion of the ionic impurities therefrom. Certain ionic impurities are removed somewhat more readily than others, for example, sodium is removed rather readily, whereas heavier metals are removed somewhat more slowly. It has been found that contact times as short as one minute will suffice to remove sufficient ionic impurities from calcined alumina to obtain the improvements desired according to the objects of this invention. In some instances, contact times as long as from four to six hours may be required in order to remove sufficient ionic impurities from a highly contaminated calcined alumina to obtain the desired improvement. In general, it has been found that contacting times ranging from two minutes to one hour are sufficient to accomplish the desired removal of ionic impurities from calcined alumina.

If both cationic and anionic types of impurities are found in the same alumina they can be removed by contacting the calcined alumina first with either the cationic or anionic resin and then with the opposite type of ion exchange resin in separate contacting steps. If it is desired, however, both cationic and anionic types of impurities can be removed simultaneously by the use of a mixture of the cation exchange resin and the anion exchange resin in the same vessel. The highest temperature which can be employed in such a method is, of course, the disintegration temperature of the ion exchange resin having the lower disintegration temperature.

The quantity of ion exchange resin required for removing impurities from the alumina is determined by the necessity of having efficient contacting between the two solids which amount, in general, is considerably greater than the amount calculated solely on the basis of the capacity of the resin and the quantities of impurities to be removed. The reason that such excessive "capacity" of ion exchange resin is required is not known. However, it is believed that it is necessary to have a large quantity of the resin present such that the probability that the impurities will be transferred to a resin particle is much greater than the probability that the impurities will be transferred merely to another alumina particle.

In general it has been found that the ratio of alumina to ion exchange resin should range between about 0.25 gram to 1.0 gram of alumina per milliliter of wet ion exchange resin.

The contacting between the ion exchange resin and the calcined alumina is carried out at the pH that results when the well-washed resin is suspended in water and contacted with the alumina. It has been found that a pH of more than 6 is obtained when a cation exchange resin that has been carefully washed is contacted with an aqueous suspension of calcined alumina. In all cases whether the contacting is with a cation exchange resin or with an anion exchange resin the pH of the contacting should be that resulting when the well-washed resin is brought into contact with the alumina suspension in the absence of added acid or added alkali. In summary it has been found that best results are obtained if neither acid or alkali is added to the contacting solution to adjust pH during contacting.

In the examples which follow, reference will be made to a number of commercially available aluminas, such as chi alumina, gamma alumina, eta alumina, alpha alumina monohydrate, alpha alumina trihydrate, beta alumina trihydrate, and the like. These aluminas are described in the article "Thermal Transformations of Aluminas and Alumina Hydrates," by H. C. Stumpf, A. S. Russell, J. W. Newsome and C. M. Tucker, in Industrial and Engineering Chemistry, volume 52, p. 1398 et seq. (1950).

In order to attain the desired removal of ionic impurities from the alumina of this invention it has been found necessary to heat such materials to elevated temperatures, for example, to 900° F. for a sufficient time to render the alumina more susceptible to the removal of impurities therefrom. It is this heating step, designated herein as calcination, that produces the calcined alumina. It is preferred to heat alumina to 900° F. for about one hour in order to calcine the alumina and thereby facilitate the removal of ionic impurities from it when it is contacted with the ion exchange material. This calcination treatment may be omitted in those instances wherein the alumina has been subjected to equivalent high temperatures during use as a catalyst carrier.

The examples which follow will serve to demonstrate the utility of the instant invention in the purification of calcined alumina and, in addition, will serve to illustrate various specific embodiments of the invention.

*Example I*

A 250–300 gram portion of Aluminum Company of America Grade C–31 Alumina (alpha alumina trihydrate) was calcined by heating to 900° F. for one hour; thus converting the alpha alumina trihydrate to a mixture of chi alumina and gamma alumina, with the chi phase predominating. This calcined alumina contained 0.27 percent by weight of sodium. This alumina was then added to 250 cc. of the cation exchange resin, Amberlite IR–120 which was in the hydrogen cycle, and sufficient water was added to bring the total volume to approximately 800 cc. The alumina had a particle size of less than 100 mesh U.S. Standard Sieve, and the resin particles were in the 20 to 40 mesh size range. The mixture was stirred vigorously for one hour at room temperature, following which the resin was separated from the alumina particles by screening. The resin was washed with additional water to remove any adhering alumina and the alumina was separated from the water, dried and analyzed for sodium content. It was found to have a sodium content of 0.09 percent by weight.

*Example II*

A treatment like that of Example I was made on a grade C–31 alumina which had not been calcined. In this case, the sodium content was reduced from 0.27 percent by weight to 0.20 percent by weight. Comparison of this example with Example I shows that calcination of the alumina is necessary in order to remove impurities by the process of this invention.

*Example III*

A 250 to 300 gram portion of Aluminum Company of American Grade C–33 alumina (alpha alumina trihydrate, less than 100 mesh particle size) was calcined by heating to 900° F. for one hour, which treatment converted the alumina to a mixture of chi alumina and gamma alumina as in Example I. This activated alumina which had a sodium content of 0.26 percent by weight was batch treated with the same cation exchange resin in the same manner as in Example I. The sodium content was reduced to 0.06 percent by weight.

*Example IV*

A 250 to 300 gram portion of Grade C–33 alumina like that of Example III was calcined at 900° F. for one hour and thereafter suspended in from 2.5 to 3.0 liters of water. This suspension was passed upwardly at room temperature through a column of approximately 200 cc. of Amberlite IR–120 resin in the hydrogen cycle which was held in place by screens of a size sufficient to allow the alumina suspension to pass through but which retained the resin within the column. The flow rate was adjusted such that the contact time of the alumina with the resin was about two minutes. After the suspension of alumina had been passed through the resin particles, an additional two liters of water was passed through the bed to remove any adhering alumina particles from the resin particles. The alumina was recovered, dried and analyzed. It was found that the sodium content had been reduced from 0.27 percent by weight down to 0.06 percent by weight.

*Example V*

In accordance with the method set forth by Allen S. Russell and C. Norman Cochran in "Surface Areas of Heated Alumina Hydrates," Industrial and Engineering Chemistry, volume 40, page 1336 (1950), eta alumina was prepared by contacting a sodium aluminate solution at a temperature of 104° F. with carbon dioxide to give the beta alumina trihydrate which, with heat calcination at 900° F. for two hours, was converted into the desired eta form. An approximately 250 gram sample of this eta alumina whose particle size was less than 100 mesh was batch treated with the cation exchange resin in exactly the same manner as set forth in Example I. The sodium content of the alumina was reduced from 0.27 percent down to 0.02 percent by weight.

*Example VI*

An approximately 170 gram sample of the same calcined alumina employed in Example I was placed in a column and washed by passing 11,000 cc. of water therethrough. It was noted that the sodium content was reduced from 0.27 percent by weight down to approximately 0.14 percent by weight, but that the rate of removal toward the end of the treat was exceedingly slow so that any further removal of sodium would require prohibitively large amounts of water in addition to the exceedingly large amounts which already had been used. This example shows that it is entirely impractical and likely impossible to remove ionic impurities by water washing alone.

The other examples demonstrate, however, that a calcined alumina containing a cationic impurity may have that impurity removed to very low levels quickly and cheaply by ion exchange treatment in accordance with the teachings of this invention.

*Example VII*

An approximately 250 gram portion of a commercial calcined alumina in the form of gamma alumina was found to contain 0.55 percent by weight of chloride. This portion of calcined alumina was admixed with approximately 250 cc. of Amberlite IRA–400 anion exchange resin which was in the hydroxyl cycle. Sufficient water was added to bring the total volume to approximately 800 cc. and the mixture stirred vigorously for one hour. The resin (approximately 20 to 40 mesh particle size) was separated from the alumina (through 100 mesh particle size) by screening. The alumina was then dried and analyzed and found to contain 0.02 percent by weight of chloride.

*Example VIII*

An approximately 250 gram portion of Aluminum Company of America F–10 Grade calcined alumina (a mixture of chi alumina and gamma alumina) was found to contain 0.60 percent by weight of chloride. This material was treated by the method set forth in Example VII. The treated alumina was found to have a chloride content of 0.03 percent by weight.

Examples VII and VIII demonstrate that an anionic exchange resin may be used to remove substantially completely anionic impurities from calcined aluminas.

Similar experiments have been carried out at more elevated temperatures with similar results. It has been found that occasionally the alumina becomes partially hydrated during the ion exchange treatment and, therefore, it may be necessary to recalcine the alumina by heating at about 900° F.

Preferably the resin is regenerated after each contacting with the alumina in order to insure that the required amount of resin capacity is present for the next contacting cycle. The anion exchange resins can be regenerated by contact with an alkali solution such as sodium hydroxide and then washed with distilled water so that the resin will be in the hydroxyl cycle. The cation exchange resins may be regenerated by contact with a strong mineral acid such as a dilute hydrochloric or sulfuric acid solution and thereafter washed with water so that the resin will be in the hydrogen cycle and ready for reuse.

It is to be noted that the ionic impurities associated with the calcined alumina of this invention can be removed only if the alumina is contacted with an ion exchange material which is in the active cycle, i.e., if a cationic exchange material is being employed it should be in the hydrogen cycle, whereas if an anionic exchange material is being employed it should be in the hydroxyl cycle.

In order to demonstrate the utility of the instant invention, use was made of the fact that calcined alumina is a carrier for platinum in catalysts which are employed for the reforming of gasoline boiling range hydrocarbon fractions to improve their anti-knock properties.

A commercial type reforming catalyst was prepared by depositing platinum on calcined alumina which had been treated to remove its sodium content in accordance with the method of Example I. The amount of platinum was selected so that the final catalyst contained 0.55 percent by weight, based on the weight of the final catalyst. The platinized alumina was admixed with an equal weight of a silica-alumina cracking component which had had its activity adjusted by steaming prior to admixture with the platinized alumina such that under the test conditions the reforming catalyst produced a gasoline having an octane number (CFRR-O) of 88.

An identical commercial type reforming catalyst containing 0.54 percent platinum based on the weight of the final catalyst was prepared using the same alumina as employed in Example I, but which had not been treated to remove its sodium content. Under the test conditions the reforming catalyst prepared from the purified alumina showed no decline in dehydrogenation activity, while the reforming catalyst prepared from the unpurified alumina showed a substantial decrease in dehydrogenation activity. The octane number decline of the gasoline produced (as determined by successive determinations during the time the catalysts were on test) in the instance of the catalyst made with the unpurified alumina, was approximately two and a half times as great as for the catalyst made with the purified alumina.

These tests demonstrate that a more active and stable catalyst is obtained if the calcined alumina carrier material is purified according to the method of the instant invention.

The term "ionic" as applied to the various impurities found associated with calcined alumina has been used throughout the foregoing description to designate those impurities which may be contained in the lattice of the aluminum oxide or deposited on the surface of the aluminum oxide. It is not known in what form these impurities are contained in the lattice or deposited on the oxide, however, only very small amounts of these impurities go into solution when the alumina is immersed in water. Thus, even when exceedingly large quantities of water are used for washing the alumina, it is not possible to remove more than a portion of these impurities. It is quite unexpected, therefore, that, as demonstrated by the examples above, it is possible to remove these impurities quickly and economically by employing an ion exchange material.

We claim:
1. A method for removing ionic impurities from alumina which has been calcined by heating to at least 900° F. for at least one hour which comprises contacting an aqueous suspension of said calcined alumina with a solid ion exchange resin at a temperature ranging from room temperature to the temperature at which said solid ion exchange resin disintegrates for a time ranging from one minute to six hours thereby transferring at least a major portion of the ionic impurities from said calcined alumina to said resin, separating and recovering the purified alumina from the resin.

2. A method for removing cationic impurities from alumina which has been calcined by heating to at least 900° F. for at least one hour which comprises contacting an aqueous suspension of said calcined alumina with a solid cation exchange resin in the hydrogen cycle at a temperature ranging from room temperature to the temperature at which said solid cation exchange resin disintegrates for a time ranging from one minute to six hours thereby transferring at least a major portion of the cationic impurities from said calcined alumina to said resin, separating and recovering the purified alumina from the resin.

3. A method for removing anionic impurities from alumina which has been calcined by heating to at least 900° F. for at least one hour which comprises contacting an aqueous suspension of said calcined alumina with a solid anion exchange resin in the hydroxyl cycle at a temperature ranging from room temperature to the temperature at which the solid anion exchange resin disintegrates for a time ranging from one minute to six hours thereby transferring at least a major portion of the anion impurities from said calcined alumina to said resin, separating and recovering the purified alumina from the resin.

4. A method for removing cationic and anionic impurities from alumina which has been calcined by heating to at least 900° F. for at least one hour which comprises contacting an aqueous suspension of said calcined alumina with a mixture of a solid cation exchange resin in the hydrogen cycle and a solid anion exchange resin in the hydroxyl cycle at a temperature ranging from room temperature to the disintegration temperature of the ion exchange resin having the lower disintegration temperature for a time ranging from one minute to six hours thereby transferring at least a major portion of the cationic impurities to said cation exchange resin and at least a major portion of the anion impurities to said anion exchange resin, separating and recovering the purified alumina from the resins.

5. The method according to claim 2 wherein the cationic impurity is sodium.

6. The method according to claim 3 wherein the anionic impurity is chloride.

References Cited in the file of this patent
UNITED STATES PATENTS

| | | |
|---|---|---|
| 2,405,275 | Stowe | Aug. 6, 1946 |
| 2,586,882 | Stroh | Feb. 26, 1952 |
| 2,733,205 | Dalton et al. | Jan. 31, 1956 |
| 2,854,316 | McCarthy et al. | Sept. 30, 1958 |
| 2,905,534 | Braithwaite | Sept. 22, 1959 |
| 2,946,660 | Priebe et al. | July 26, 1960 |
| 2,977,185 | Goodenough | Mar. 28, 1961 |

FOREIGN PATENTS

| | | |
|---|---|---|
| 590,212 | Canada | Jan. 5, 1960 |
| 565,712 | Canada | Nov. 4, 1958 |